Patented Feb. 23, 1932

1,846,729

UNITED STATES PATENT OFFICE

ALPHONS O. JAEGER, OF MOUNT LEBANON, PENNSYLVANIA, ASSIGNOR TO THE SELDEN COMPANY, OF PITTSBURGH, PENNSYLVANIA, A CORPORATION OF DELAWARE

CATALYTIC HYDROGENATION OF NONNITROGENOUS ESTERS

No Drawing. Original application filed February 25, 1928, Serial No. 256,917. Divided and this application filed September 23, 1929. Serial No. 394,733.

The invention relates to the catalytic hydrogenation of non-nitrogenous esters in the liquid or vapor phase, with or without pressure, at ordinary or elevated temperatures.

According to the present invention non-nitrogenous organic compounds are hydrogenated in the presence of a new class of catalyst compositions, either in the liquid or the vapor phase, by means of reducing gases of all kinds, for example, hydrogen, gases containing hydrogen, gases containing carbon monoxide, such as water gas with or without the presence of ethylene, methane, carbon dioxide, water vapors, nitrogen and the like. In fact any of the ordinary reducing gases may be used. Contact masses used in the present invention contain base exchange bodies or their derivatives in which at least one component is present in non-exchangeable form or imbedded as a diluent. The invention does not include contact masses containing, when freshly prepared, base exchange bodies in which the only catalytically active component having specific activity is present in exchangeable form.

Under the term "base exchange body" are included all natural or artificial bodies which possess the properties of exchanging their bases for other bases of salt solutions. The base exchanging products used in making catalytic compositions of the present invention or as initial material for derivatives to be so used may possess high base exchanging power or in many cases may possess lower base exchanging power, since the catalytic value of the final compositions is not primarily dependent on the amount of base exchanging power present. In general the base exchange bodies may be divided into three main categories:—Two-component and multi-component zeolites, i. e., base exchange bodies containing chemically combined silicon in their nucleus and non-silicious base exchange bodies in which all of the silicon is replaced by other suitable acidic or amphoteric metal oxides. Two-component zeolites are the reaction products of two types of initial components, that is to say, metallates and silicates (using the term metallate in a somewhat broader sense as will be defined further on in the description) or metal salts and silicates. Frequently more than one member of a type may enter into reaction, that is to say, a silicate may react with more than one metallate or more than one metal salt. The multi-component zeolites are the reaction products of at least three types of components, that is to say, at least one silicate, at least one metallate, and at least one metal salt.

The base exchange bodies, both zeolites and non-silicious base exchange bodies, may be associated with diluents preferably in the form of a physically homogeneous structure, as will be described below. Either diluted or undiluted base exchange bodies may be present in the contact masses used in the present invention, or their derivatives may be present, but it should be understood that wherever base exchange bodies are referred to both diluted and undiluted products are included.

Base exchange bodies, both zeolites and non-silicious base exchange bodies, may also be transformed into derivatives which possess many of the chemical and most of the physcial characteristics of the parent base exchange bodies. Such derivatives may be salt-like bodies, that is to say, the reaction products of base exchange bodies with compounds containing anions capable of reacting with the base exchange bodies to form products which possess many of the properties of salts. A further class of derivatives are the acid leached base exchange bodies. When a base exchange body is subjected to leaching by acids, particularly dilute mineral acids, the exchangeable bases are first gradually removed. The resulting products contain both the more basic and the more acidic components of the non-exchangeable nucleus of the base exchange body, with or without a portion of the exchangeable bases. As the leaching is carried on further, more and more of the relatively positive components of the non-exchangeable nucleus are removed, and if carried to completion the leached product contains only the relatively acid components of the non-exchangeable nucleus. In the case of zeolites the final product from long continued leaching is a complex silicic acid which has many of the physical properties of the original base exchange body. In the description and claims the class of base exchange bodies and their derivatives will be referred to by the generic term "permutogenetic" products.

Catalytically active components may be associated with diluted or undiluted permutogenetic bodies in three main forms as follows:—(1) They may be physically admixed with or impregnated into the permutogenetic products. (2) They may be physically homogeneously incorporated into the permutogenetic products before the latter have been completely formed in the form of catalytically active diluent bodies or in the form of diluents which have been impregnated with catalytically active substances. (3) They may be chemically combined with or in the permutogenetic products in non-exchangeable form, that is to say, they may form a part of the non-exchangeable nucleus of the base exchange body present in the final contact mass or which is transformed into the derivatives, or they may be chemically combined with the base exchange bodies in the form of catalytically active anions which form with the base exchange body salt-like bodies. Obviously of course the same or different catalytically active components may be present in more than one of the above described forms, and it is an advantage of the present invention that catalytically active substances may be chemically combined in non-exchangeable form or physically combined with permutogenetic bodies in a wide variety of forms, which gives a wide field of choice to the catalytic chemist. While the different permutogenetic products may vary widely in their chemical characteristics, they all possess a similar physical structure which is characterized by more or less high porosity, frequently microporosity, and great resistance to high temperatures, and in the case of products which have not been acid leached to the point of removal of catalytically active components these components are distributed throughout the framework of the products in atomic or molecular dispersion, as will be described in greater detail below, and this chemical homogeneity is one of the important advantages of some of the contact masses of the present invention.

While two of the methods of combination of the catalytically active substances may be effected with undiluted as well as diluted permutogenetic products, it has been found that for most reactions homogeneously diluted permutogenetic contact masses are of advantage, particularly where the diluents are of a physical nature such as to exert a desired influence on a catalytic activity of the contact masses, as when, for example, diluents are rich in silica, which has been found to have an activating power, or where the diluents by reason of high porosity, capillarity, or surface energy may be considered as physical catalysts or activators.

Base exchange bodies used in contact masses of the present invention behave as if they were products of extremely high molecular weight for catalytically active components can be introduced into the non-exchangeable nucleus in practically any desirable proportions and the ordinary law of chemical combining proportions, which in compounds of low molecular weight restricts the proportions in which components can be incorporated chemically, appears to be without force, which makes it reasonable to assume that the molecular weight is so high as to completely mask the effect of the law. It is of course possible that the base exchange bodies, or some of them, may be solid solutions of a plurality of related compounds of lower molecular weight. It has not been possible hitherto to definitely settle this question, as base exchange bodies are not readily capable of structural chemical analysis. The present invention is of course not limited to any theory, but irrespective of the underlying reasons the fact that catalytically active components may be chemically introduced in any desired proportions is of enormous importance to the catalytic chemist and gives him the power to produce an almost unlimited number of finely and gradually toned catalysts or contact masses for the various reductions and hydrogenations of organic nitrogen compounds. In all cases the contact masses produced are highly effective by reason of the desirable physical structure of the permutogenetic products contained therein and the wide limits of homogeneous dilution of catalytically active molecules or atoms with resulting uniformity and smoothness of action, which is of great importance, particularly for some relatively sensitive hydrogenations included within the scope of the present invention.

In addition to the important characteristics with which permutogenetic products endow the contact masses of the present invention it has been found that for many of the reactions coming within the scope of the present invention it is desirable to stabilize the contact masses, and this may be effected by associating with the permutogenetic products or incorporating or forming therein compounds of the alkali forming metals, that is to say, alkali metals, the alkaline earth metals, and the strongly basic earth metals. These compounds appear to slow up or smooth out the catalytic reaction, and will be referred to throughout this specification as stabilizers. While for some reactions strongly alkaline stabilizers are not harmful, it has been found that for many reactions it is important to provide non-alkaline stabilizers, such as for example, the salts or compounds or alkali forming metals which do not possess an alkaline reaction. It is a great advantage of the present invention that in the normal formation of base exchange bodies alkali forming metal oxides are present as exchangeable bases, and whether used without acid treatment or treated with acid, they form stabilizers which are combined in or associated with the resulting permutogenetic products in an extremely fine state of division in which the stabilizers are peculiarly active. Thus base exchange bodies containing alkali forming metal exchangeable bases may be considered as complex stabilizers.

In addition to the use of stabilizers which are important in a large number of hydrogenations included in the scope of the present invention, it has been found that the stabilizer action and the overall efficiency of the contact masses can in many cases be greatly increased or enhanced with the association therewith or chemical combination therein of elements or radicals or groups which are catalytically active but do not possess specific catalytic activity for the particular reaction to be carried out. Thus for example in the case of a hydrogenation reaction, certain catalysts which at the temperatures used in the reaction behave as dehydrogenation catalysts may be added to enhance and tone the catalytic activity of the catalysts or the operation of the stabilizers. Similarly in some cases oxidation catalysts, such as those containing metal elements of the fifth and sixth groups of the periodic system may greatly improve the effectiveness of the contact mass used, especially where it is desirable to produce intermediate products which in some cases are relatively unstable. Some other reduction reactions involve the splitting off of water or in some cases the splitting off of carbon dioxide, and may also involve molecular condensations. In such reactions it is very desirable to incorporate catalysts or catalytic components which are not specific reduction catalysts but which may favor dehydration, splitting off of carbon dioxide or condensation. Such catalysts or catalytic components which are not specific catalysts for the reaction in which they are being used under the reaction conditions obtaining will be referred to throughout the specification as stabilizer promoters, as they appear to enhance the toning effect which can be achieved by stabilizers. The use of this expression should, however, in no sense be taken to limit the invention to a particular theory of action of these non-specific catalysts and in fact in some cases stabilizer promoters may be present where there are no stabilizers.

The tremendous range of chemical groups which may be combined in or with or incorporated in permutogenetic products permits a wide choice of stabilizer promoters as well as specific catalysts and permits their association with the contact masses in an extremely homogeneous and catalytically efficient form. Thus many base exchange bodies or their derivatives may be considered as complex catalysts, stabilizers and stabilizer promoters, as all of these elements may be present in the same chemical compound and sharing the advantages flowing from its desirable physical structure and chemical properties. Of course both stabilizer and stabilizer promoters may be mixed partly or wholly with permutogenetic products and a single stabilizer or single stabilizer promoter may be present partly in physical admixture and partly in chemical combination, as will be clear to the skilled base exchange chemist.

The base exchange bodies which form the important components or initial material for derivatives in contact masses of the present invention may be prepared in any of the well known methods. Thus for example, two-component zeolites may be prepared by wet methods, in which the metallate components or metal salt components, part or all of which may be catalytically active, are caused to react with soluble silicates to form zeolites of alumino silicate or aluminum double silicate types, or the components may be fused, preferably in the presence of fluxes. It should be understood that under the term metallate is included not only the alkaline solutions of amphoteric metal oxides or hydroxides but also alkali forming metal salts of metal acids, such as the oxyacids of metals of the fifth and sixth groups, which in at least one stage of oxidation are not strictly speaking amphoteric, but which products are capable of reacting with silicates to form zeolites, or with other components to form non-silicious base exchange bodies. Throughout the specification this somewhat more general definition of metallates will be strictly adhered to. In the formation of two-component zeolites by wet methods, the final reaction product must be alkaline to litmus, and for products of high base exchanging power it should be neutral or alkaline to phenolphthalein. For the purpose of producing base exchange bodies to be used in the preparation of contact masses of the present invention it is sometimes unnecessary to provide high base exchanging power, and for many purposes zeolites formed under conditions resulting in a final reaction which is acid to phenolphthalein but alkaline to litmus are of advantage. It is not definitely known whether products produced under such circumstances are homogeneous chemical compounds, although in many ways they behave as such. There is, however, reason to believe that in some cases at least mixtures of base exchanging and non-base exchanging polysilicates may be produced. For the purpose of the present specification a product will be considered as a base exchange product if it has any base exchange power at all.

It is desirable for many purposes and particularly where two-component zeolites of high base exchanging power are needed to add the relatively acid components, for example, metal salts in the case of aluminum double silicate type of silicates, to the relatively more alkaline components such as for example soluble silicates. By these means a continuous alkalinity is insured, and this method may be considered as the preferred method in most cases, but the opposite procedure is advantageous for certain contact masses and is included in the invention.

Multi-component zeolites may be prepared by any of the foregoing methods using at least three types of components, that is to say, at least one metallate, at least one metal salt and at least one soluble silicate. In the case of multi-component zeolites, as in the case of two-component zeolites, the conditions of alkalinity should be observed, and for many purposes it is advantageous to add the relatively acid components to the relatively alkaline components, in order to insure continuous alkaline reaction. The multi-component zeolites produced vary in their nature, dependent on the proportion of the different reacting components. Thus where the metallates and silicates predominate over the metal salts the resulting products resemble the alumino silicate type of two-component zeolites. If the metal salts and silicates predominate over the metallates the products resemble the aluminum double silicate type of two-component zeolites, and finally if the metallates and metal salts predominate over the silicates the resulting product resembles more or less non-silicious base exchange bodies. It will be clear that there is no sharp defining line between the three types of multi-component zeolites, and one shades into the other as the proportions of the different components vary. It is an advantage of the multi-component zeolites over the two-component zeolites that the choice of catalytically active components is wider, as some catalytically active elements or groups can only be incorporated in the form of metallates and others only in the form of metal salts. In a multi-component zeolite each catalytically active group can be incorporated in the form in which it is best available.

Non-silicious base exchange bodies are produced by the general methods described above, but instead of bringing about reactions between silicates and other metal oxide components, two or more oxymetal compounds are caused to react, in general, at least one will be a metallate and at least one a metal salt, or in some cases it is possible to bring about action between two different metallates in which one negative radical is more acidic than the other. It is possible to produce non-silicious base exchange bodies in which a plurality of metal oxides are present. It is also possible to produce non-silicious base exchange bodies in which a single metal is present. Thus for example, some metals may be sufficiently amphoteric in character to form both metallates and metal salts which are capable of reacting with each other to produce base exchange bodies.

A special method of producing non-silicious base exchange bodies consists in the gradual neutralization of strongly alkaline salts of the oxyacids of metal elements of the fifth and sixth groups of the periodic table in stages of oxidation in which they are sufficiently amphoteric. The neutralization of other strongly alkaline metallates may also bring about formation of non-silicious base exchange bodies. The converse method, whereby non-alkaline salts of suitable metals are gradually treated with alkali until the reaction is sufficiently alkaline to permit the formation of base exchange bodies, may also be used.

Many metals are capable of entering into the base exchange formation only in certain stages of oxidation, and it is sometimes necessary to introduce such metals in a stage of oxidation different from that desired in the final base exchange body, the change of stage of oxidation being preferably effected during the formation of the base exchange body. Certain other elements may be incorporated in the form of complex compounds of the most various types, such as for example, ammonia complexes and the like.

In addition to the artificial base exchange bodies briefly described above, natural base exchange bodies, such as nepheline, leucite, felspar, and the like, may be used.

The most important contact masses for many reactions contain permutogenetic products in which preferably the diluents are homogeneously incorporated into the base exchange bodies before formation of the latter, or at least before the base exchange body has set after formation. Many diluents, both inert, stabilizing, activating, catalytically active, or having stabilizer promoter effects, can be used. A few of the diluents will be briefly enumerated:—kieselguhrs of all kinds, particularly natural or treated celite earth, silicious powders of various types, powdered permutogenetic products, natural or artificial powders of rocks, stones, tuffs, trass, lava, and similarly volcanic products which are frequently highly porous, greensand, glauconite or its acid leached derivative glaucosil, pulverized slag wool, cements, sand, silica gel, pulverized earthenware, fullers earth, talc, glass powder, pumice meal, asbestos, graphite, activated carbon, quartz meal, various pulverized minerals rich in quartz, metal powders and metal alloy powders, salts of oxymetal acids such as tungstates, vanadates, chromates, uranates, manganates, cerates, molybdates, etc., particularly copper salts of the above, silicates, such as copper silicate, iron silicate, nickel silicate, cobalt silicate, aluminum silicate, titanium silicate, minerals or ores, especially those rich in copper, etc. Finely divided diluents are of great advantage, especially when the average particle size is less than 60 microns, in which case the diluents possess high surface energy, which increases the adsorptive and absorptive capacity of the contact mass, the diffusion speed and porosity. These finely divided diluents may be considered as physical catalysts or activators. Diluted permutogenetic bodies may also be finely divided and used as part or all of the diluents of other base exchange bodies.

The following nine methods are the most effective for the introduction of diluents, but any other suitable methods can be used.

(1) The diluents may be mixed with one or more liquid components of the base exchange bodies to be formed when the latter are prepared by wet methods.

(2) Components, either catalytically active, stabilizer promoters, or others, may be precipitated or impregnated into diluent bodies which are then incorporated into the base exchange bodies by any suitable methods of incorporation.

(3) Diluents may be mixed with base exchange bodies while the latter are still in the form of gels, by kneading or stirring, in which case the base exchange gel behaves as an adhesive. The homogeneity and uniformity of the distribution of the diluents is of course not so great by this method as by method (1), but for many catalytic hydrogenations of non-nitrogenous organic compounds extreme uniformity is not essential.

(4) Diluents may be formed during the formation of base exchange bodies by mixing suitable compounds with the components of the base exchange bodies so that the diluent particles are precipitated during formation. Protective colloids may be added to prevent coagulation of the diluent particles before the base exchange bodies have become sufficiently set.

(5) Compounds may be added which react with certain of the base exchange body forming components to produce diluents, for instance salts of the metal acids of the fifth and sixth groups may be added in sufficient excess so that they react with components of the base exchange body to form insoluble diluents, as for example with heavy metal oxides.

(6) Preformed base exchange bodies, diluted or undiluted, artificial or natural, can be impregnated with true or colloidal solutions of catalytically effective components and then dried.

(7) A preformed base exchange body, diluted or undiluted, may be impregnated with a plurality of solutions which react therein to precipitate any desired diluents.

(8) Soluble diluent compounds may be added to the components forming a base exchange body, which after formation retains the compounds in solution and is dried without washing or is treated to precipitate the compounds.

(9) Natural base exchange bodies or artificial base exchange bodies, diluted or undiluted, or their derivatives, may be impregnated with solutions of the desired compounds, which are then precipitated by means of reactive gases.

The nucleus or non-exchangeable portion of the molecules of the base exchange bodies is ordinarily considered to consist of two types of oxides, namely, relatively basic metal oxides, usually amphoteric, and relatively acidic oxides, such as $SiO_2$, some amphoteric metal oxides and some metal oxides which have a distinctly acid character. The nucleus behaves as a single anion and cannot be split by ordinary chemical means, but it is advantageous to consider the two portions of the nucleus as the basic and acidic portions, bearing in mind of course that the nucleus behaves as a single group. The metal compounds which are capable of forming the basic portion of the nucleus are those of the following metals:—copper, silver, gold, bismuth, beryllium, zinc, cadmium, boron, aluminum, some rare earths, titanium, zirconium, tin, lead, thorium, niobium, antimony, tantalum, chromium, molybdenum, tungsten, uranium, vanadium, manganese, iron, nickel, cobalt, platinum, palladium. Compounds of these elements may be introduced singly or in mixtures, in any desired proportions, and may be in the form of simple or complex ions.

It should be understood that some of the elements in certain stages of oxidation may be introduced either as metallates or metal salts. Others may be introduced in only one form, and still others may be introduced in a stage of oxidation other than that desired in the final base exchange body or in the form of complex compounds. Among the complex ionogens are ammonia, hydrocyanic acid, oxalic acid, formic acid, tartaric acid, citric acid, glycerine, and the like.

Many of the metals are specific catalysts, others are stabilizers, and still others are stabilizer promoters. Naturally the status of an element as catalyst or stabilizer promoter will vary with the particular reduction or hydrogenation reaction for which the final contact mass is to be used, and the choice of catalysts and stabilizer promoters together with the proportions will be determined by the particular catalytic reduction or hydrogenation of the particular organic compound for which the contact mass is to be used.

Examples of components forming the relatively acid portion of the base exchange nucleus are alkali metal silicates, which are soluble in alkali, and alkali metal salts of acids, such as those of boron, phosphorus, nitrogen, tin, titanium, vanadium, tungsten, chromium, niobium, tantalum, uranium, antimony, manganese, etc.

The exchangeable bases of the base exchange bodies may be substituted by base exchange, and the elements which can be introduced singly or in admixture by base exchange are the following:—copper, silver, gold, ammonia, beryllium, calcium, manganese, caesium, potassium, sodium, zinc, strontium, cadmium, barium, lead, aluminum, scandium, titanium, zirconium, tin, antimony, thorium, vanadium, lithium, rubidium, thallium, bismuth, chromium, uranium, manganese, iron, cobalt, nickel, ruthenium, palladium, platinum and cerium.

Depending on the reactions in which the contact mass is to be used, the exchangeable bases introduced may be specific catalysts, they may be stabilizers, or they may be stabilizer promoters. They may be introduced as simple ions or as complex ions, and may enhance the catalytic activity of the final contact mass, improve its physical structure, or both. It should be understood that while the present invention does not include hydrogenations in which permutogenetic contact masses are used containing exchangeable bases as their only specific catalysts certain catalytically active elements such as, for example, some of those enumerated in a foregoing paragraph, may be introduced by base exchange into contact masses which already contain specific catalytically active components present in non-exchangeable form either in the non-exchangeable nucleus of the base exchange molecule or chemically united therewith in the form of anions to produce salt-like bodies or imbedded therein in the form of diluents.

As has been described above, base exchange bodies can be caused to react with compounds containing acidic radicals capable of forming therewith salt-like bodies. The radicals may be present in the form of simple acid radicals, polyacid radicals or complex acid radicals, and include radicals containing the following elements:—chromium, vanadium, tungsten, uranium, molybdenum, manganese, tantalum, niobium, antimony, selenium, tellurium, phosphorus, bismuth, tin, chlorine, platinum, boron. Among the complex radicals are ferro and ferricyanogen, certain ammonia complexes and the like. The amount of acid radicals caused to unite with the base exchange bodies to form salt-like bodies may be varied so that the resulting products may possess the character of acid, neutral or basic salts. Most of these acid radicals are stabilizers or stabilizer promoters for the catalytic hydrogenation of non-nitrogenous compounds.

The base exchange bodies diluted or undiluted, or some of their salt like body derivatives, may be treated with acids, such as mineral acids, for example, 2–10% sulfuric, hydrochloric or nitric acids, to remove part or all of the exchangeable bases, or also part or all of the basic portion of the nucleus.

In the case of zeolites, the partial leaching with acid, which leaves part or all of the basic portion of the nucleus or even part of the exchangeable bases, does not affect the function of the zeolites as catalysts when they contain catalytically active elements in the basic portion of the nucleus, or in some cases even exchangeable bases, and such partially leached catalysts are of great importance in many reactions. Where the leaching is carried out to completion the advantageous physical structure remains to a considerable extent the same, but the remainder is of course a form of silica, or in the case of zeolites in which part of the silica is replaced by other acidic compounds, a mixture of the two, and usually will not be a specific catalyst for the hydrogenation of non-nitrogenous organic compounds. It serves, however, as an advantageous physical carrier of specific catalysts, and in the case of partially substituted zeolites may also contain stabilizer promoters.

Leached non-silicious base exchange bodies, either partially or completely leached, may contain catalytically active components and behave as catalyst, stabilizer promotors or both, and many important catalysts for the hydrogenation of non-nitrogenous organic compounds are thus obtained. This is particularly the case for reactions where a relatively alkali-free contact mass is required for best results and where the alkaline content of a contact mass containing a base exchange body may be too great for optimum results.

Base exchange bodies or their derivatives, diluted or undiluted, may also be coated in the form of films on massive carrier granules or may be impregnated therein. The massive carriers may be inert, activating, or themselves catalysts. For example, certain catalytic metal alloys, minerals, especially copper minerals, fall within this class. Aluminum or copper alloy granules perform an additional advantageous function in that their relatively high heat conductivity tends to prevent local overheating in highly exothermic hydrogenations of non-nitrogenous organic compounds which is of considerable importance in obtaining good yields, as many of the reactions, particularly hydrogenations, are equilibrium reactions, and at higher temperatures hydrogenation catalysts reverse their function and tend to favor dehydrogenation with resulting lowering of yields and contamination of the product.

Example 1

Four solutions are prepared, as follows:

1. 27 parts of freshly precipitated chromium hydroxide in the form of a suspension, as obtained by precipitation from the corresponding chromous salt solution, are treated with sufficient 2 N. sodium hydroxide solution to transform them into the corresponding sodium chromite.

2. 8 parts of cadmium nitrate with 4 mols of water are dissolved in 50 parts of water and sufficient 2 N. sodium hydroxide solution is added until the corresponding sodium cadmiate solution is obtained.

3. 4 parts of $V_2O_4$, freshly prepared by reducing a corresponding amount of $V_2O_5$, are dissolved in 5 N. sodium hydroxide solution to the coffee brown sodium vanadite.

4. 50 parts of nickel nitrate are dissolved in 250 parts of water.

Solutions 1, 2 and 3 are mixed together, and 30 parts of colloidal $SiO_2$, kieselguhr or finely pulverized activated carbon, or a mixture, are added as diluents and thoroughly mixed. The nickel nitrate mixture is added to the mixed metallates with vigorous agitation until the reaction product obtained is slightly alkaline or neutral to phenolphthalein. In any event strong alkalinity to litmus must be maintained. The reaction product is then freed from the mother liquor without washing the constituents and the non-silicious base exchange body contains chromium, cadmium, vanadium and nickel in non-exchangeable form diluted with the finely divided silicious material, or activated carbon. The base exchange body is preferably hydrated with water by trickling the latter over the crushed base exchange fragments, and then dried, whereupon it is reduced with hydrogen-containing gas at temperatures from 250 to 350° C.

The contact mass prepared as described above is very effective for the catalytic hydrogenation of esters of unsaturated acids, such as, for example, the esters of maleic and fumaric acids to esters of succinic acid, esters of acrylic acid to esters of propionic acid, and the like. The hydrogenaton should take place in the presence of hydrogen-containing gases, using either the theoretical amount or, preferably, an excess, and may be carried out either in the vapor phase or in the liquid phase, with or without pressure at ordinary or elevated temperatures.

As an example of these reactions dimethyl maleate, having a boiling point of 205° C., with or without admixture of dimethyl fumarate with a boiling point of 192° C., is vaporized with a more or less great excess of hydrogen and passed over the contact mass at 170–190° C., preferably in a converter which permits close control of temperature, such as a converter provided with automatic double countercurrent heat exchange. The corresponding dimethyl ester of succinic acid is obtained and, if desired, may be saponified to produce succinic acid of high purity.

Under the same reaction conditions free maleic acid can also be hydrogenated to succinic acid with an excess of hydrogen, but where any considerable amount of fumaric acid is present the latter is not sufficiently volatile to get into the gas stream, and it is, therefore, preferable in most cases to hydrogenate the esters.

The same contact mass may be used for hydrogenating these esters or acids in the liquid phase. Instead of using the acids, however, which would strongly corrode the reaction vessel, the alkali metal salts such as the sodium salts, may be used in aqueous solution, the catalyst of course being suspended as in all liquid phase reactions. While the process can be carried out at room temperature, it is preferable to use a somewhat elevated temperature. Instead of using the concentrated esters, they may be diluted with indifferent solvents such as alcohols, acetone, cyclohexane, cyclohexanol, and the like. It is also possible to emulsify the esters with water, but very vigorous agitation must be maintained in order to keep a good emulsion.

The contact mass may be further modified by introducing copper through base exchange, for example by trickling 3 to 5% copper salt solutions such as copper nitrate over the hydrated contact mass, in order to partly replace the exchangeable alkali. Copper in this case tones the nickel and the other constituents may be considered as stabilizer promoters as these tone the effect of the alkali stabilizer.

Another modification may be obtained by leaching the base exchange catalyst with dilute acid to leach out the exchangeable alkali present, the desirable physical structure of the contact mass being retained. The leached product should be reduced at 300–400° C., and can then be effectively used for the hydrogenation of unsaturated esters, for example crotonyl esters may be reduced with gases containing hydrogen in the theoretical amount or in small excess, the mixture being passed over the contact mass at 120–140° C., and producing butyl esters as the main product.

Example 2

50 parts of kieselguhr are suspended in 300 parts of water and 50 parts of concentrated hydrochloric acid are poured in and the whole is heated up to 60–70° C. with vigorous agitation. The kieselguhr is then filtered off and washed with distilled water until entirely free from acid and the purified product is suspended in a nickel nitrate solution containing 180 parts of nickel nitrate with 6 mols of water in 500 c. c. of water. Nickel hydroxide is then precipitated in a fine state of division in the kieselguhr using 2 N. sodium hydroxide solution, whereupon the mass is filtered and carefully washed with distilled water until free from sodium nitrate.

24 parts of $SiO_2$ in the form of a commercial sodium waterglass solution, as free from iron as possible, are diluted with 250 parts of water and the kieselguhr impregnated with nickel hydroxide is suspended therein with vigorous agitation.

8 parts of $Al_2O_3$ in the form of the hydroxide freshly precipitated from a salt solution with ammonia are treated with 2 N. sodium hydroxide solution until all of the aluminium oxide goes into the solution as sodium aluminate. This solution is then poured into the waterglass suspension with vigorous agitation and heated to 50–60° C. resulting in the precipitation of an aluminum zeolite containing nickel hydroxide and kieselguhr as diluents. The yield of the zeolite may be increased by neutralizing any excess of alkali with dilute nitric acid. The zeolite is then sucked from the mother liquor, washed with 500 parts of water in small portions and dried preferably at temperatures below 100° C.

After drying the zeolite is hydrated with water in the usual manner, again dried and pulverized and then treated with hydrogen-containing gases. After this preliminary treatment the contact mass is well suited for the reduction of unsaturated esters. The effectiveness of the zeolite contact mass may also be enhanced by the introduction of magnesium oxide or oxides of the rare earth metals by base exchange. Another modification consists in leaching the zeolite with dilute acids removing part or all of the exchangeable alkali. The leaching may be effected by treating the zeolite after hydration with 1–3% nitric acid until the desired amount of alkali has been removed. The amount of nitric acid necessary can be readily determined by testing a sample of the zeolite.

Instead of using an aluminate as the metallate component of the contact mass, other metallates may be substituted, for example beryllate may replace part or all of the aluminate. Other metal oxides can be introduced by base exchange and may possess specific catalytic properties or be stabilizer promoters.

Where a high concentration of catalytically effective metal oxides, such as nickel oxide, are present, either as diluents or embedded in the zeolite molecule, it is sometimes of advantage to treat the contact mass with compounds containing the acid radicals of the metal acids of the 5th and 6th groups of the periodic system in order to form the so-called salt-like bodies, thus, for example the diluted zeolite prepared as described above may be treated with 3–5% of nickel nitrate solution until a maximum of base exchange has taken place. After washing out the excess nickel nitrate the wet zeolite is treated with 500 parts of 1% ammonium vanadate solution, the solution being permitted to trickle over the zeolite on a filter. The resulting product is a salt-like body and is a well stabilized contact mass for the reduction of unsaturated esters.

Of course other nickel containing contact masses described in the foregoing examples may also be used for reduction of unsaturated esters.

Other hydrogenations may be effected by means of the same contact mass. Thus, for example, esters of phthalic acid, such as dimethyl, dibutyl, or diamyl phthalates can be hydrogenated to the corresponding esters of hexahydrophthalic acid. Similarly, esters of benzoic or toluic acid can be hydrogenated to the corresponding hexahydro derivatives. Terpenes can also be hydrogenated at 180–200° C. in the vapor phase with an excess of hydrogen.

In the claims the term "permutogenetic" covers base exchange bodies, silicious or non-silicious, the products obtained by the acid leaching of these base exchange bodies and the salt-like bodies obtained by the reaction of these base exchange bodies with compounds the acid radicals of which are capable of reacting with the base exchange bodies to produce products which show most of the properties of salts. When so used in the claims, the term "permutogenetic" will have no other meaning.

This case is a division of my pending application Serial No. 256,917 filed February 25, 1928.

What is claimed as new is:

1. A method of catalytically hydrogenating esters of nitrogen-free unsaturated acids, which comprises causing them to react with hydrogen containing gases in the presence of a contact mass containing a permutogenetic body, at least one catalytically effective component being other than an exchangeable base.

2. A method of catalytically hydrogenating esters of nitrogen-free unsaturated acids, which comprises vaporizing them, mixing the vapor with hydrogen containing gases, and passing the mixture at a reaction temperature over a contact mass containing a permutogenetic body, at least one catalytically effective component being other than an exchangeable base.

3. A method of catalytically hydrogenating esters of nitrogen-free unsaturated acids, which comprises subjecting them to reaction with hydrogen containing gases in the presence of a contact mass containing a permutogenetic body having at least one catalytically effective component other than an exchangeable base and also containing at least one substance included within the group consisting of dehydrogenation catalysts, oxidation catalysts, splitting catalysts, and condensation catalysts.

4. A method of catalytically hydrogenating esters of nitrogen-free unsaturated acids, which comprises subjecting them to reaction with hydrogen containing gases in the presence of a contact mass containing a permutogenetic body having at least one catalytically effective component other than an exchangeable base and containing at least one compound of an element included in the group consisting of alkali metals, alkaline earth metals and rare earth metals whose oxides are not reducible by hydrogen and at least one substance included within the group consisting of dehydrogenation catalysts, oxidation catalysts, splitting catalysts, and condensation catalysts.

5. A method of catalytically hydrogenating esters of nitrogen-free unsaturated acids, which comprises causing them to react with hydrogen containing gases in the presence of a contact mass containing a permutogenetic body, at least a portion of the catalytically effective components being chemically combined in non-exchangeable form in or with the permutogenetic body.

6. A method of catalytically hydrogenating esters of nitrogen-free unsaturated acids, which comprises causing them to react with hydrogen containing gases in the presence of a contact mass containing a diluted permutogenetic body.

7. A method according to claim 6, in which at least a portion of the catalytically effective components are present in the form of diluents in the permutogenetic body.

8. A method according to claim 6, in which the diluted permutogenetic body contains at least one substance included within the group consisting of dehydrogenation catalysts, oxidation catalysts, splitting catalysts, and condensation catalysts.

9. A method according to claim 6, in which the diluted permutogenetic body contains at least one compound of an element included in the group consisting of alkali metals, alkaline earth metals, and rare earth metals whose oxides are not reducible by hydrogen.

10. A method according to claim 6, in which the diluted permutogenetic body contains at least one compound of an element included in the group consisting of alkali metals, alkaline earth metals, and rare earth metals whose oxides are not reducible by hydrogen, and at east one substance included within the group consisting of dehydrogenation catalysts, oxidation catalysts, splitting catalysts, and condensation catalysts.

11. A method of hydrogenating esters of nitrogen-free unsaturated aliphatic acids, which comprises causing them to react with hydrogen containing gases in the presence of a contact mass containing a permutogenetic body, at least one catalytically effective component being other than an exchangeable base.

12. A method of catalytically hydrogenating esters of non-nitrogeneous unsaturated aliphatic acids, which comprises causing them to react with hydrogen containing gases in the presence of a contact mass containing a diluted permutogenetic body.

13. A method of catalytically hydrogenating esters of maleic acid to esters of succinic acid, which comprises causing them to react with hydrogen containing gases in the presence of a contact mass containing a permutogenetic body, at least one catalytically effective component being other than an exchangeable base.

14. A method of catalytically hydrogenating esters of maleic acid to esters of succinic acid, which comprises causing them to react with hydrogen containing gases in the presence of a contact mass containing a diluted permutogenetic body.

15. Method according to claim 13, in which the esters are vaporized by means of gases containing hydrogen and the reaction is effected in the vapor phase.

16. Method according to claim 14, in which the esters are vaporized by means of gases containing hydrogen and the reaction is effected in the vapor phase.

Signed at Pittsburgh, Pennsylvania, this 20th day of September, 1929.

ALPHONS O. JAEGER.